June 6, 1950  A. S. VOLPIN  2,510,442
RUBBER SEALED GATE VALVE
Filed Dec. 22, 1945  3 Sheets-Sheet 3
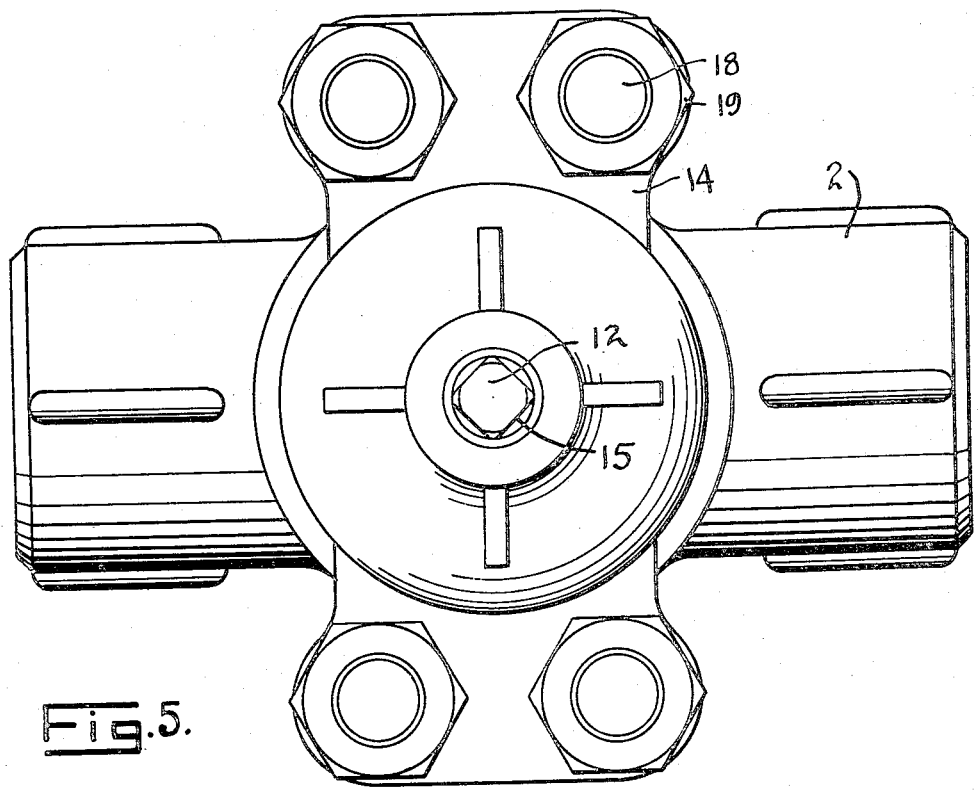
Fig. 5.
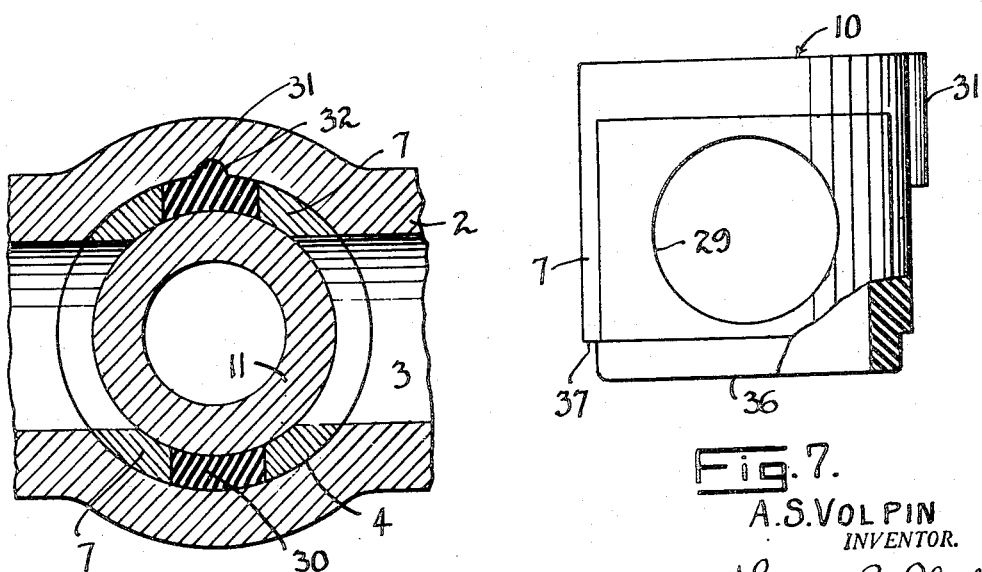
Fig. 6.
Fig. 7.
A. S. VOLPIN
INVENTOR.
BY Lester B. Clark
+ Ray L. Smith
ATTORNEYS Patented June 6, 1950

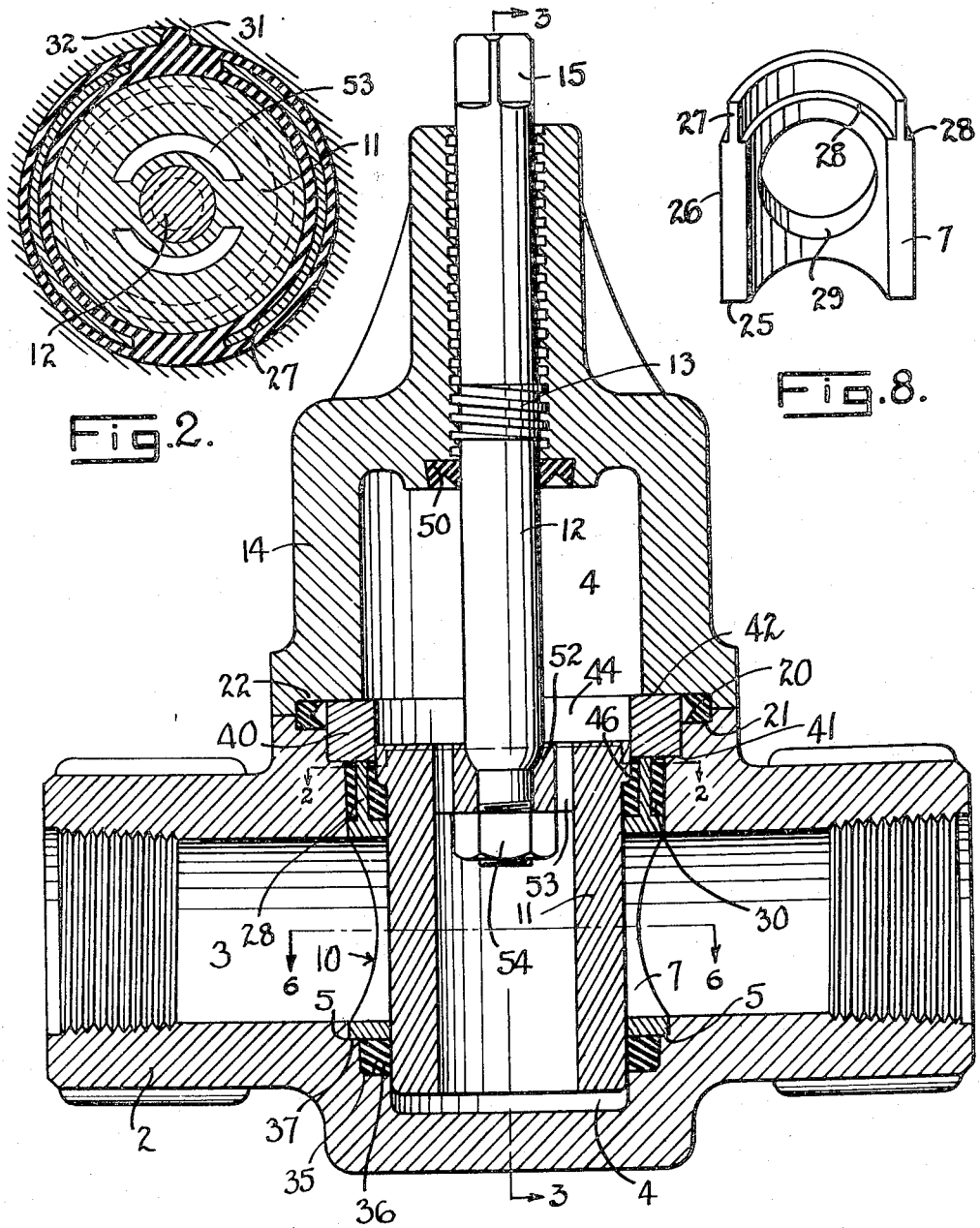

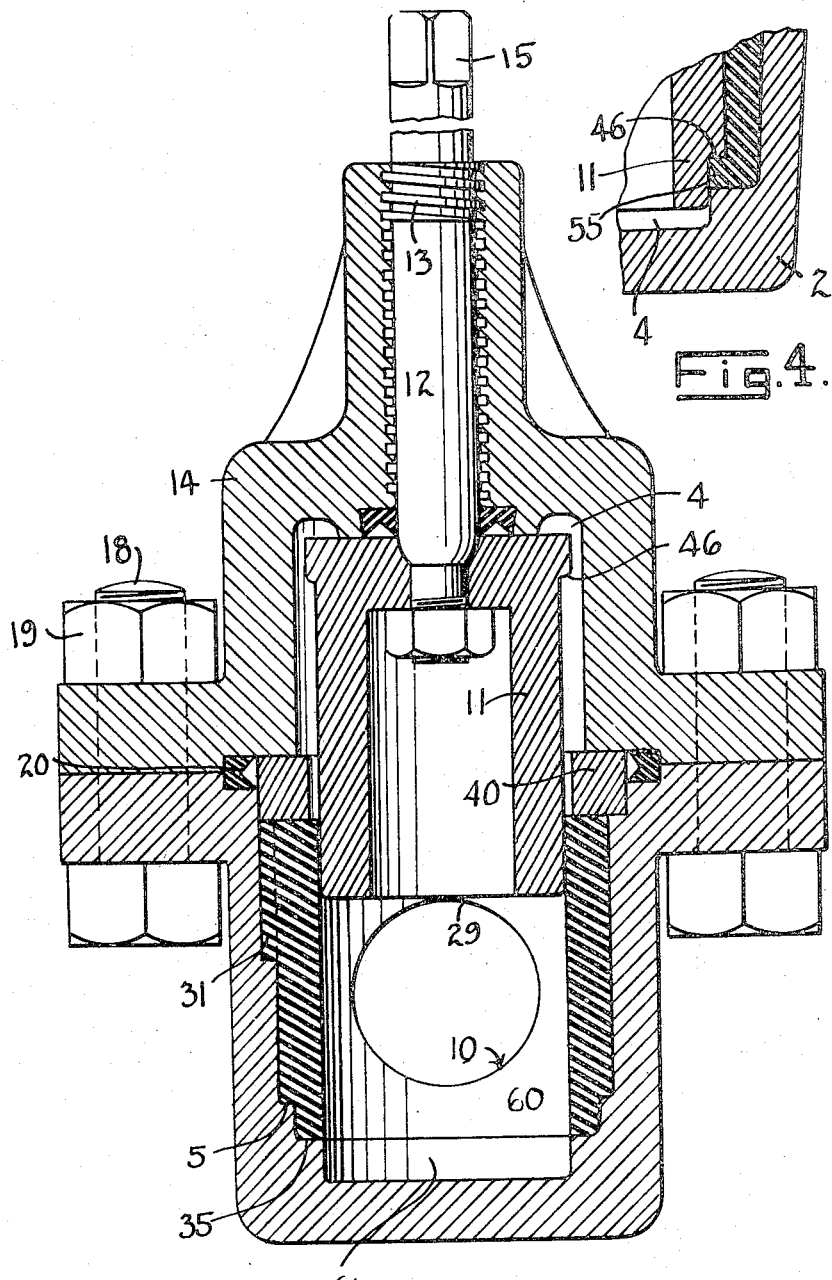

2,510,442

UNITED STATES PATENT OFFICE 2,510,442

RUBBER SEALED GATE VALVE

Alexander S. Volpin, Houston, Tex.

Application December 22, 1945, Serial No. 636,714

11 Claims. (Cl. 251—167)

The invention relates to a rubber sealed gate valve wherein a body of rubber or like resilient material is confined and subjected to pressure so as to create a seal.

It is one of the objects of the invention to provide a valve having a housing and gate member therein where the flow port seats are enclosed in rubber or resilient material which can be confined and subjected to pressure so as to form and maintain a seal about the flow port.

Another object of the invention is to provide an insert for gate valves which is in the form of a sealing assembly made up of gate seats and enclosed in sealing material so as to create a seal between the gate and the housing.

Another object of the invention is to provide a resilient seal above, below and around the sides of the seating plate for gate valves.

Another object of the invention is to provide a removable and replaceable seating assembly for gate valves which will be resiliently sealed in position.

Another object of the invention is to provide a rubber sealed gate valve wherein a confining ring is provided to retain a resilient sealing material in position.

Still another object of the invention is to provide a rubber sealed gate valve wherein the gate is wiped clean of foreign material both in moving into and out of position.

Another object of the invention is to provide a rubber sealed gate valve wherein foreign material accumulating on the face of the sealing assembly while the valve is in open position is wiped therefrom by the closing movement of the valve gate and forced into the base of the gate chamber.

Another object of the invention is to provide a rubber sealing assembly for a cylindrical type gate valve.

Another object is to provide a combination seating and sealing assembly for gate valves.

Other and further objects of the invention will be readily apparent when the following description is considered in connection with the accompanying drawings wherein:

Fig. 1 is a vertical sectional view of a gate valve constructed in accordance with the invention and shown with the gate in closed position;

Fig. 2 is a transverse sectional view illustrating the construction at the top of the gate member;

Fig. 3 is a vertical sectional view taken transversely of the valve of Fig. 1 but showing the gate in open position;

Fig. 4 is a broken detail sectional view illustrating one form of contact construction between the gate and the resilient sealing material;

Fig. 5 is a top plan view looking down on a valve constructed in accordance with the invention;

Fig. 6 is a section taken on the line 6—6 of Fig. 1;

Fig. 7 is a front elevation of the sealing unit and illustrating the construction thereof;

Fig. 8 is a perspective view of the metal frame which forms the body of the sealing unit.

In Fig. 1 the valve housing 2 has the flow passage 3 therein which is intersected by the gate chamber 4. The chamber is reduced in size just below the flow ports to provide a shoulder 5. This shoulder is arranged to receive the frame or body 7 of the sealing assembly 10. The gate member 11 is in the form of a cylinder which is reciprocable in the gate chamber 4 and is moved by a stem 12 threaded at 13 in the bonnet 14 by affixing a wheel or other tool to the non-circular portion 15 thereof. The bonnet 14 may be affixed to the body 2 by means of a plurality of bolts 18 and nuts 19 best seen in Fig. 5. A lip type packing ring 20 is shown in the recess 21 in the top of the body around the top of the gate chamber, and fits in a similar recess 22 in the bonnet so as to form a seal where the bonnet and body of the valve are engaged.

One of the essential features of the invention is the sealing assembly 10 which is made up of two frames or bodies 7 one of which is best seen in Fig. 8. This body is formed as a section of a hollow cylinder and is somewhat less than a semi-cylinder having the shoulder 25 as the base and providing a curved wall portion 26. This portion is reduced to provide the curved upstanding tongue 27 which is defined by the inner and outer shoulders 28. This frame has the cylindrical opening 29 therein which is of the same size and adapted for alignment with the flow passage 3.

Two of these frames or bodies 7 will be faced back to back as seen in Fig. 6, and are spaced apart so as to have a body of resilient material 30 vulcanized or otherwise attached thereto. This construction thus embodies a cylindrical sealing assembly 10 as best seen in Fig. 7. This assembly is of a size to fit down into the gate chamber 4, and the projecting lobe 31 is provided at the side thereof and arranged to fit in a similar recess 32 formed in the gate chamber. This orients the assembly and insures alignment of the port 29 with the flow passage 3.

In order to provide a seal about the frame 7 a shoulder 35 has been formed in the gate chamber 4 and receives the lower end 36 of the resilient body. The resilient material 30 projects somewhat beyond the lower end 25 of the frame 7 which provides a shoulder 37 arranged to seat upon a shoulder 5 formed in the gate chamber. As seen in Fig. 7 the resilient material 30 is arranged to fit about the frame 7 both at the top, bottom and sides thereof so as to seal about such metal portion.

In order to retain the sealing and seating assemblies in position, a retainer ring 40 arranged to engage upon the shoulder 41 in the valve body has been provided. This retainer ring will be engaged by the lower portion 42 of the bonnet 14 so that when the bonnet is clamped in position the resilient material will be confined.

This retainer ring 40 has a central opening 44 therein through which the gate valve 11 is arranged to pass. The gate valve in the form shown in Fig. 1 has an enlarged shoulder 46 thereon which is arranged to move into engagement with the resilient material as the valve gate moves to closed position. This enlargement 46 tends to displace some of the rubber about the valve member, and inasmuch as the rubber is of a consistency which will flow under pressure, some of the rubber is displaced and sets up a stress in the balance of the rubber so as to provide a pressure therein which preferably exceeds the pressure on the valve which is being sealed.

It seems obvious that as the shoulder 46 moves in against the packing, that only a minute flowing of the rubber material would tend to distribute the load applied to the resilient material. In this manner the resilient material is forced against the periphery of the gate chamber 4 and about the frames 7 by which the resilient material is carried.

A lip packing 50 forms a seal about the rising stem 12 for the gate member and provides a seal about the stem.

The gate 11 has an upper wall or partition 52 having a plurality of openings 53 therein to allow equalizing of the pressure, and the valve stem 12 projects through this partition 52 and is firmly locked in position by the nut 54.

Fig. 4 shows a slightly modified form of construction wherein the shoulder 46 on the gate member has been disposed adjacent the bottom of the gate 11 so as to bear against the annular extension 55 adjacent the base thereof. This is very similar to the structure described in Fig. 1 except that it is arranged adjacent the base of the chamber.

In actual operation considerable advantage is obtained because, with the parts as shown in Fig. 3, if flow has occurred through the valve, there may be a facing of dirt, grit, or other material on the face of the sealing assembly. The movement of the peculiarly shaped gate 11 therethrough serves to wipe the face 60 of the sealing assembly, and in view of the fact that the gate chamber 4 extends below the bottom of the sealing assembly, a small pocket 61 is thus formed to receive any foreign matter. Of course, the gate is shown as being hollow, and should there be an excess of material it could, of course, move up into the hollow portion of the valve.

The tongue 27 on the frame or body 7 extends through the resilient material so that the retainer ring 40 may bear thereagainst and hold the frame 7 securely upon the seat 38 so that there will be no tendency for it to move as the gate is squeezed into the rubber upon closing of the valve and pulled therefrom on the opening of the valve. It will be seen that as the gate member moves to closed position that the resilient material will not of necessity be in too close a contact with the periphery of the gate member and in this manner no excessive friction in closing is encountered. Just prior to the gate moving to fully closed position however, the shoulder 46 will move in against the upper end of the sealing material and cause it to be deformed so as to set up a pressure in the rubber. The enlarged upper end of the gate fits smoothly within the retainer ring 40 and the frame 7 is enclosed by the rubber so that the rubber is in this manner completely confined by the frame of the assembly, the chamber of the housing, and the surface of the gate. As the shoulder 46 moves into the rubber which is thus confined, a pressure will be set up in the rubber which preferably exceeds the pressure on the valve, and any tendency of the valve to leak will thus be avoided.

One of the advantages is that the bonnet may be removed and an entirely new assembly such as seen in Fig. 7 dropped into position. This provides new seats and a new sealing construction so that the valve will be withdrawn from service for a minimum period.

Broadly the invention comprehends a rubber sealed gate valve wherein a pressure is set up in confined rubber to form a seal about the gate.

What is claimed is:

1. A valve including a housing, a cylindrical valve chamber therein, a flow passage through the housing crossing said chamber, a cylindrical valve member, means to move said member in said chamber and means to provide a seal with said member at each flow port comprising a metal seat plate curved in transverse section to fit in said chamber and against said valve member, a flow port in said plate, a resilient member formed about each of said plates to provide a seal with the chamber, valve member, and housing, a retainer ring for said means abutting said plate, and a shoulder on said valve member to move against the resilient material to set up therein a pressure in excess of the fluid pressure in the valve flow passage.

2. A rubber sealed gate valve including a housing, a gate chamber therein, a gate in said chamber, a flow port and sealing assembly disposed in said chamber and comprising a pair of metal seat plates to form a flow port at opposite sides of said chamber, a gate seat on each seat plate, a resilient member disposed between the longitudinal edges of said plates to engage the chamber wall and the gate, and means on the gate to displace a portion of such resilient member to create a seal about the flow port at the sides of the gate between said plates.

3. A gate valve including a body, a cylindrical gate chamber having opposed flow ports, a cylindrical gate reciprocable in said chamber, a cylindrical sealing assembly removably fitted in said chamber to receive said gate and comprising a pair of frames of rigid material seated in said chamber to fit one about each of said ports and positioned in spaced relation to each other to engage said body and gate, resilient sealing material disposed substantially about the periphery of said frames, cooperating surfaces on said resilient sealing material and said gate whereby a downward movement of the gate compresses the sealing material against said chamber, frames and gate to effect a seal.

4. A gate valve having a body with a cylindrical chamber and opposed flow ports therein, a cylindrical gate for said chamber, means to move said gate, the diameter of said chamber being substantially greater than said gate to provide an annular space therearound, a cylindrical sealing element removably positioned in said annular space and comprising a rigid portion to align with each of said ports, a resilient sealing material about each of said rigid portions, cooperating surfaces in said chamber, gate and rigid portions to completely confine said sealing material, and means movable with said gate to establish a unit pressure in said material in excess of line pressure.

5. A frame for cylindrical gate valves comprising an arcuate semi-cylindrical portion, an upstanding arcuate tongue thereon, and a flow port transversely of said frame portion.

6. A gate valve, comprising a body having opposed flow ports, a stepped cylindrical chamber therein having a bore of at least two different diameters, a cylindrical gate, the smaller of said diameters closely receiving a portion of said gate in the closed position, the larger of said diameters providing an annular space about said gate, a resilient sealing member removably disposed in said annular space, means carried by said gate to compress said resilient sealing member, a rigid frame comprising a portion of such sealing member at each port to confine said sealing member against extrusion into said ports, said cylindrical gate being of a size to enter said resilient sealing member so that the sliding movement of said gate relative to said resilient sealing member tends to wipe away line sediment from the coacting sealing surfaces.

7. A rubber sealed gate valve comprising a body, a bonnet affixed thereto, a stepped cylindrical gate chamber in said body, a cylindrical gate of lesser diameter than said chamber to provide with such chamber a stepped annular space, a sealing assembly insert comprising a pair of rigid arcuate frame members, a flow port in each member, a body of resilient material disposed about the peripheral edges of said frames to contact the body, gate and frame, and means to retain said insert between said body and bonnet to wipe said gate on opening and closing thereof.

8. A rubber sealed gate valve comprising a body, a bonnet affixed thereto, a stepped cylindrical gate chamber in said body, a cylindrical gate of lesser diameter than said chamber to provide with such chamber a stepped annular space, a sealing assembly insert comprising a pair of rigid arcuate frame members, a flow port in each member, a body of resilient material disposed about the peripheral edges of said frames to contact the body, gate and frame, and means to retain said insert between said body and bonnet to wipe said gate on opening and closing thereof, and a shoulder on said gate to also engage said resilient material to apply a pressure thereon upon closing movement of said gate so as to establish a unit area pressure in the resilient material to form a seal.

9. A sealing unit for gate valves having a flow passage and a cylindrical gate chamber intersecting such passage, an imperforate cylindrical gate of substantially lesser diameter than the chamber and comprising a hollow cylinder, a ported arcuate frame of rigid material at each side of the chamber constituting a portion of said unit, the remainder of said sealing unit comprising a resilient material to seal with the chamber, gate and frames.

10. A sealing assembly insert for cylindrical gate valves comprising an annulus to fit in the gate chamber of a valve body and to receive the gate, a pair of arcuate seat members forming a part of said insert, said members each having a flow passage therethrough, means to retain said seat members between the gate body and the gate, and resilient means about the periphery of each of said members to provide a seal therearound and with the gate and the valve body.

11. A gate valve body and bonnet, a cylindrical gate chamber therein, a cylindrical gate of substantially lesser diameter than said chamber, a sealing insert assembly to fit in said chamber about said gate, said insert including a pair of ported arcuate seat members, resilient means about each of said seat members to provide a seal therearound and with said gate and said valve body chamber, and means including said bonnet to retain said assembly in said chamber.

ALEXANDER S. VOLPIN.

REFERENCES CITED

The following references are of record in the file of this patent:

UNITED STATES PATENTS

| Number | Name | Date |
|---|---|---|
| 1,849,580 | Klinger | Mar. 15, 1932 |
| 1,998,882 | Merrill | Apr. 23, 1935 |
| 2,194,262 | Allen | Mar. 19, 1940 |
| 2,194,264 | Abercrombie et al. | Mar. 19, 1940 |
| 2,238,357 | Allen | Apr. 15, 1941 |
| 2,331,557 | Lorehn | Oct. 12, 1943 |